United States Patent
Call et al.

(10) Patent No.: US 9,563,732 B1
(45) Date of Patent: Feb. 7, 2017

(54) IN-PLANE COPPER IMBALANCE FOR WARPAGE PREDICTION

(71) Applicant: INTERNATIONAL BUSINESS MACHINES CORPORATION, Armonk, NY (US)

(72) Inventors: Anson J. Call, Poughkeepsie, NY (US); Vijayeshwar D. Khanna, Millwood, NY (US); David J. Russell, Owego, NY (US); Krishna R. Tunga, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/006,567

(22) Filed: Jan. 26, 2016

(51) Int. Cl.
*G06F 17/50* (2006.01)
*H05K 3/00* (2006.01)

(52) U.S. Cl.
CPC ......... *G06F 17/5068* (2013.01); *H05K 3/0005* (2013.01)

(58) Field of Classification Search
CPC .................................................. G06F 17/5068
USPC ........................................................ 716/110
See application file for complete search history.

(56) References Cited

U.S. PATENT DOCUMENTS

| | | | |
|---|---|---|---|
| 5,888,630 A * | 3/1999 | Sylvester | H01L 21/4857 257/E23.062 |
| 7,482,180 B1 | 1/2009 | Sylvestre et al. | |
| 7,873,932 B2 | 1/2011 | Kakino et al. | |
| 7,950,144 B2 | 5/2011 | Ramanathan et al. | |
| 8,650,512 B1 * | 2/2014 | Daubenspeck | G06F 17/5081 703/14 |
| 2002/0041032 A1 * | 4/2002 | Yamamoto | B32B 15/08 257/762 |
| 2011/0130860 A1 * | 6/2011 | Kelley | H05K 3/4638 700/121 |
| 2013/0105063 A1 * | 5/2013 | Dauksher | B32B 37/182 156/64 |
| 2013/0320578 A1 * | 12/2013 | Blackshear | H01L 21/4803 264/40.1 |
| 2014/0159213 A1 | 6/2014 | McConnelee et al. | |
| 2014/0268603 A1 | 9/2014 | Hoffmeyer et al. | |
| 2015/0248516 A1 * | 9/2015 | Hada | G06F 17/5086 716/110 |

FOREIGN PATENT DOCUMENTS

| | | |
|---|---|---|
| JP | 2007079833 A | 3/2007 |
| JP | 3927076 B2 | 6/2007 |
| JP | 2010021287 A1 | 1/2012 |

OTHER PUBLICATIONS

Kobayashi, "Application of Thermo-Viscoelastic Laminated Plate Theory to Predict Warpage of Printed Circuit Boards," (2010), IEEE, seven pages.

(Continued)

*Primary Examiner* — Suresh Memula
(74) *Attorney, Agent, or Firm* — Cantor Colburn LLP; Steven Meyers

(57) ABSTRACT

A method of predicting warpage of a laminate is disclosed in which in-plane copper imbalance is calculated. A method of designing an organic build-up laminate is provided in which in-plane copper imbalance is calculated and imbalances are corrected.

16 Claims, 7 Drawing Sheets

(56) References Cited

OTHER PUBLICATIONS

Tan et al., "Application of Lamination Theory to Study Warpage Across PWB and PWBA During Convective Reflow Process," IEEE Transactions on Components, Packaging and Manufacturing Technology, vol. 2, No. 2 (Feb. 2012) pp. 217-223.
Yarom et al., "Application of Thermoelastic Lamination Theory to Predict Warpage of a Symmetric and Simply Supported Printed Wiring Board During Temperature Cycling," School of Mechanical Engineering, Georgia Institute of Technology, (1998) pp. 345-352.

\* cited by examiner

Pattern 300

IN-PLANE COPPER IMBALANCE FOR WARPAGE PREDICTION

BACKGROUND

The present disclosure relates to predicting the laminate substrate warpage. More particularly, the present disclosure relates to analyzing conductive layers included in the laminate substrate and adjusting the composition of the conductive layers so that the warpage is minimized.

Laminate substrates are designed for electrical functionality and typically include a glass fiber reinforced core; "top" and "bottom" conductive layers; and top/bottom dielectric layers that are placed between the conductive layers. The conductive layers include a conductive material (e.g., copper) that is circuitized during fabrication according to each layer's corresponding design. The top and bottom conductive layers are typically utilized for signal routing (wiring layers) and as power layers (voltage and ground).

Laminate warpage results when a different bending resistance and/or bending forces exist above and below the laminate substrate's core. A coefficient of thermal expansion (CTE) mismatch between the dielectric layers and the copper remaining on the conductive layers and dielectric cure shrinkage during fabrication are driving forces for bending as the temperature changes, such as during module assembly operations or during laminate fabrication.

Current industry practice is to reduce laminate warpage at the design stage by using one of the following methods. a) Reducing out-of-plane copper imbalance, b) using analytical equations based on classical laminate plate theory, however, analytical equations are not exact but only an approximation, and prone to error due to volume averaging and material property assumptions made, c) performing Finite-Element based mechanical modeling to predict warpage, which is time consuming and prone to error due to material property assumptions made in the model.

SUMMARY

According to an embodiment of the present invention, an improved method is provided for reducing warpage of organic build-up laminates by predicting the warpage during the design phase based on inclusion of the in-plane copper imbalance.

According to another embodiment of the present invention, a method is provided for designing an organic build-up laminate by a) substantially completing the laminate design, b) calculating the copper imbalance, c) predicting the laminate warpage based on the copper imbalance, d) modifying the design by adding or removing copper from select areas to reduce the copper imbalance, e) recalculating the copper imbalance, f) predicting the laminate warpage based on the improved copper imbalance, g) repeating steps d-f until the predicted laminate warpage meets the desired warpage target.

According to another embodiment of the present invention, an improved organic build-up laminate is provided as the product of a method of designing an organic build-up laminate by a) substantially completing the laminate design, b) calculating the copper imbalance, c) predicting the laminate warpage based on the copper imbalance, d) modifying the design by adding or removing copper form select areas to reduce the copper imbalance, e) recalculating the copper imbalance, f) predicting the laminate warpage based on the improved copper imbalance, g) repeating steps d-f until the predicted laminate warpage meets the desired warpage target.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

The following detailed description will generally follow the summary of the disclosure, as set forth above, further explaining and expanding the definitions of the various aspects and embodiments of the disclosure as necessary.

DETAILED DESCRIPTION

The beneficial effects of including the in-plane copper imbalance in addition to out-of-plane copper imbalance on experimentally measured warpage is illustrated in the following.

Figure 1:
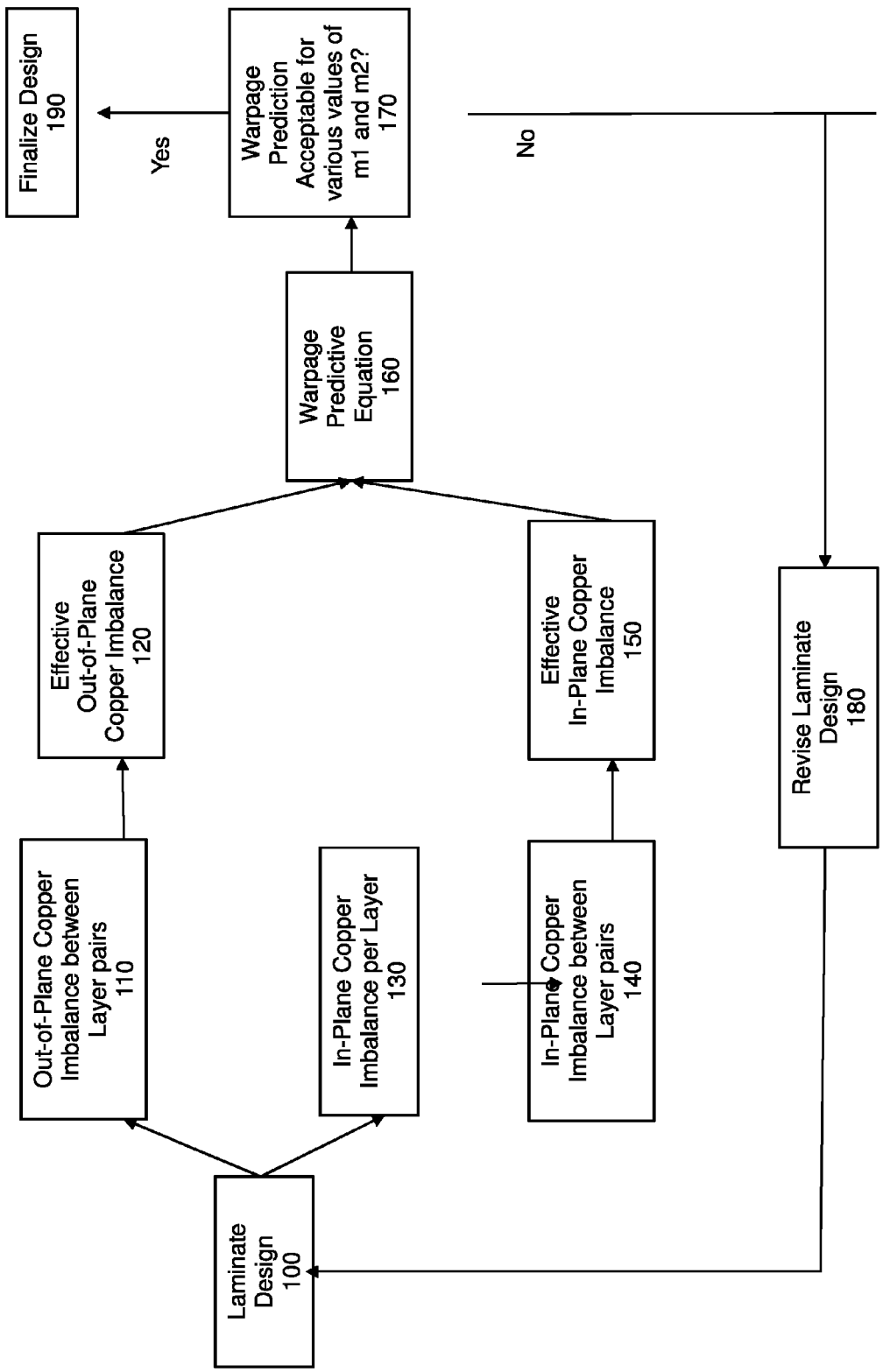
FIG. 1 is a flow chart which illustrates the design process.

With reference now to the Figures, FIG. 1 is a flow chart which illustrates the steps of the design process in which a Laminate Design 100 is analyzed for Out-of-Plane Copper Imbalance between Layer Pairs 110, and Effective Out-of-Plane Copper Imbalance 120, In-Plane Copper Imbalance per Layer 130, In-Plane Copper Imbalance between Layer pairs 140 and Effective In-Plane Copper Imbalance 150. The results obtained from Effective Out-of-Plane Copper Imbalance 120, and Effective In-Plane Copper Imbalance 150, are used in the Warpage Predictive Equation 160 to determine if the Warpage Prediction is Acceptable for various m1 and m2 values 170. If the Warpage Prediction is acceptable, the process proceeds to Finalize the Design 190. If the Warpage Prediction is unacceptable, the process proceeds to Revise the Laminate Design 180, which recycles to Laminate Design 100.

Figure 2:
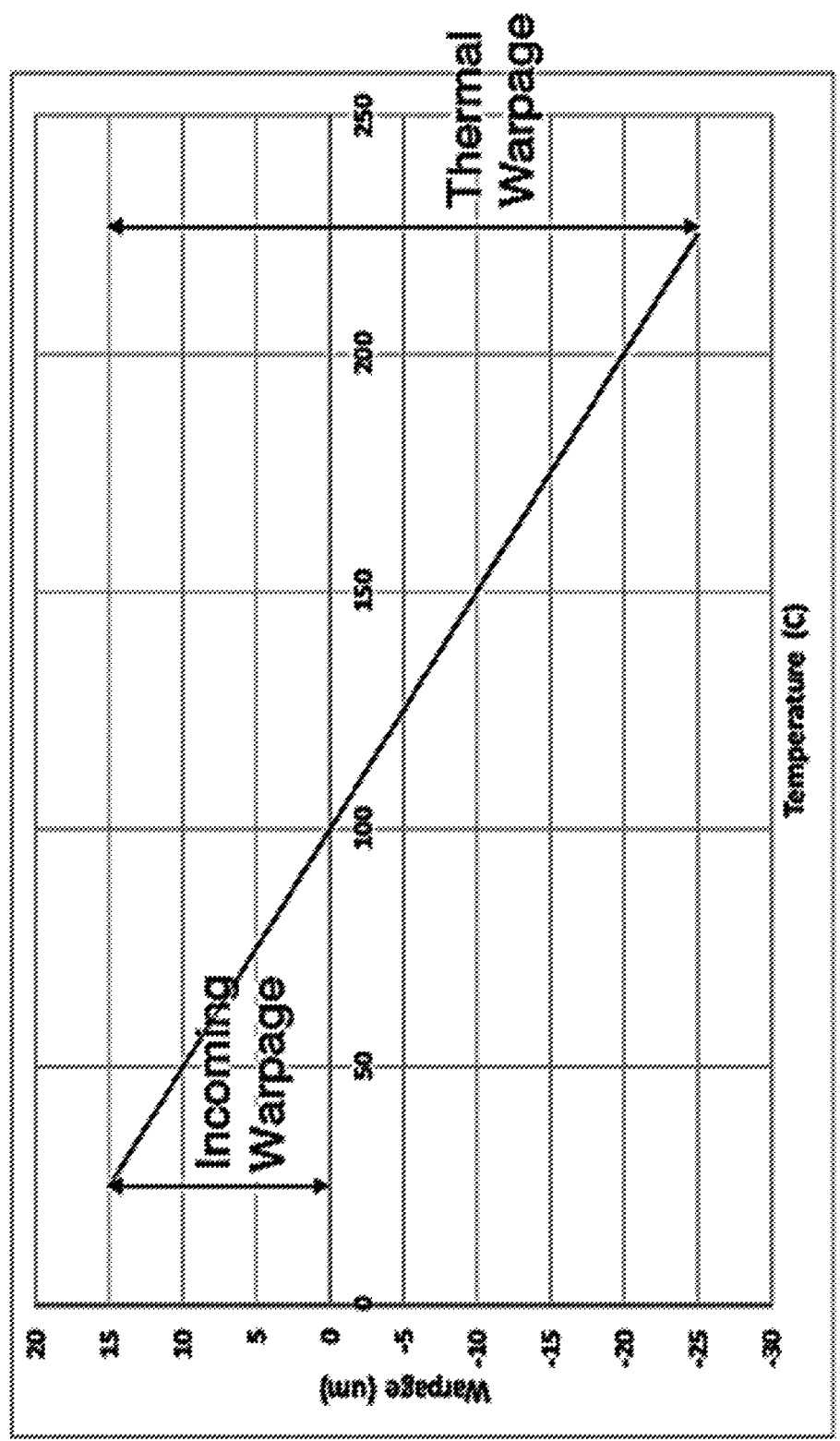
FIG. 2 is a graph of warpage versus temperature.

FIG. 2 is a graph of warpage versus temperature. Incoming warpage is the amount of warpage measured at room temperature in a laminate as it is received from its source (e.g. 15 um in the plot shown in FIG. 2). Thermal warpage is the change in warpage observed after the laminate is heated from room temperature to solder reflow temperature at ~225° C. (e.g. −40 um in the plot shown in FIG. 2).

Figure 3:
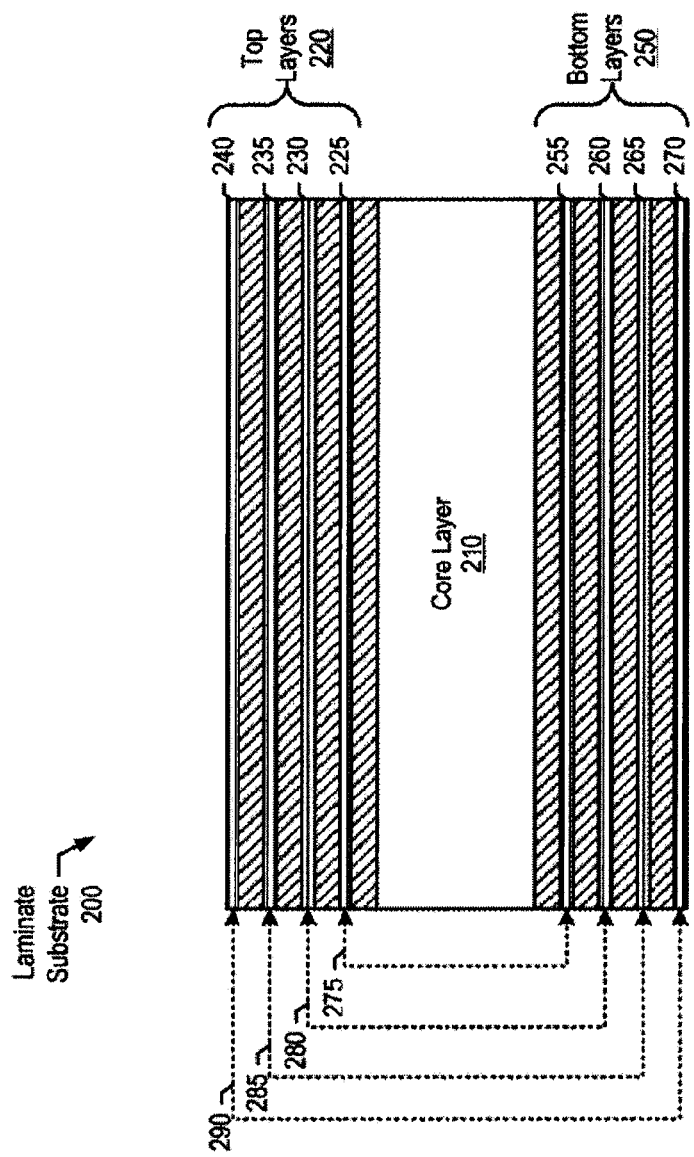
FIG. 3 is a cutaway illustration of layers within a laminate.

FIG. 3 is a diagram showing a laminate substrate that includes multiple conductive layer pairs. Laminate substrate 200 includes core layer 210, top layers 220 which are collectively referred to in the formulae as FCx, and bottom layers 250 which are collectively referred to in the formulae as BCx. Top layers 220 include top conductive layers 225, 230, 235, 240, and dielectric layers placed between the conductive layers. Bottom layers 250 include bottom conductive layers 255, 260, 265, 270, and dielectric layers placed between the conductive layers.

Each of the top conductive layers is paired with one of the bottom conductive layers according to their distance from core 210. As such, each of conductive layer pairs 275, 280, 285, and 290 include top conductive layers and bottom conductive layers that are equidistant to core layer 210. In one embodiment, top conductive layer 240 is a top surface metallurgy (TSM) layer on which a flip chip die attaches. In this embodiment, bottom conductive layer 270 is a bottom surface metallurgy (BSM) layer on which solder balls attach (for soldering to a printed circuit board).

A typical laminate substrate design includes conductive layers that are utilized as "wiring" layers and "power" or "ground" layers. The wiring layers include copper lines that make electrical connections between two or more nodes on the wiring layer, and the power layers supply power (voltage or ground) to nodes included on the power layers. In one embodiment, the laminate substrate may be utilized in a flip chip plastic ball grid array (FCPBGA) package. In this embodiment, the wiring layers are typically included on top of a core layer, referred to herein as top conductive layers, and the power layers are included on bottom of the core layer, herein referred to as bottom conductive layers (see FIG. 2 and corresponding text for further details) although some power layers may be included in the top layers. As those skilled in the art can appreciate, a laminate substrate may be utilized in other applications such as with coreless chip carriers, flip chip plastic land grid array (FCPLGA) packages, and wirebond packages.

A wiring layer may include multiple conductive tracks that are routed in groups with spaces between the conductive tracks, herein referred to as wiring patterns. Each layer included in a laminate substrate is "paired" with another conductive layer on opposite sides of the laminate substrate's core layer.

Figure 3A:
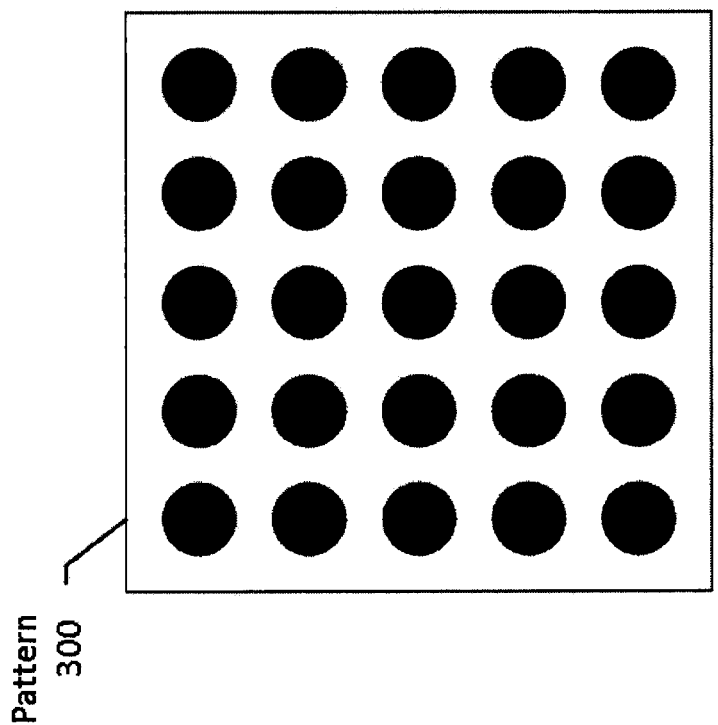
FIG. 3A is a diagram showing conductive patterns.
Figure 3B:
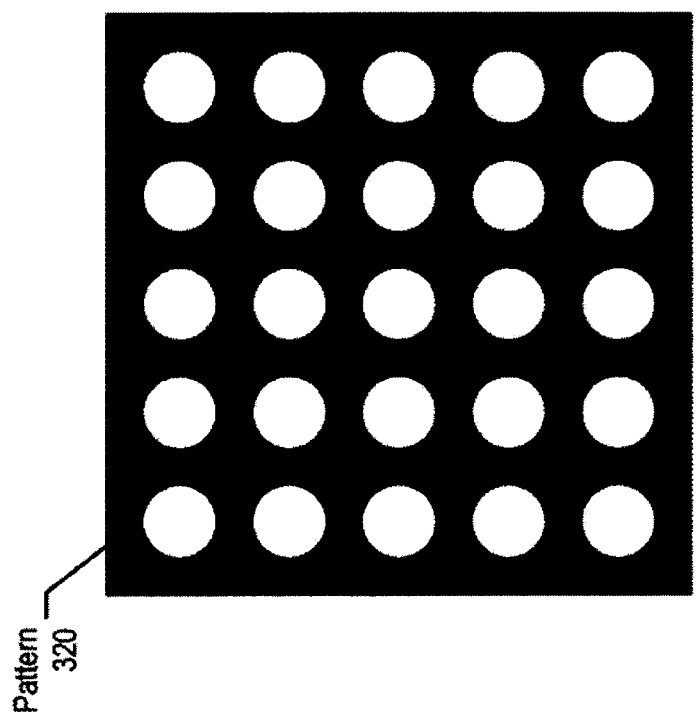
FIG. 3B is a diagram showing conductive patterns.

FIGS. 3A and 3B are diagrams showing conductive patterns that produce different bending resistances. Each of patterns 300 and 320 include the same amount of conductive material (e.g., copper represented as white area), but pattern 300's contiguous nature produces a higher bending resistance than pattern 320 (harder to bend). As such, the copper pattern on a conductive layer is more significant to minimizing warpage than the actual amount of copper on the conductive layer. Therefore, by removing copper from a power layer in areas corresponding to the power plane layer's paired wiring layer layout, warpage is minimized.

The copper balancing alone is insufficient to reduce warpage. Instead, the combination of CTE balance and bending resistance balance (e.g., modulus) minimizes warpage. In one embodiment, a typical FCPBGA design has more wiring layers on the top side of the core layer and less wiring layers on the bottom side of the core layer. Layers with more wiring patterns tend to have a higher CTE (coefficient of thermal expansion) and a lower bending resistance, and solid plane layers have a higher bending resistance and lower CTE, even though they may have the same percent copper in the layers. A higher CTE is a driving force for bending as is cure shrinkage of the dielectric, while the copper is a resistive force of the bending of the laminate substrate.

Figure 4:
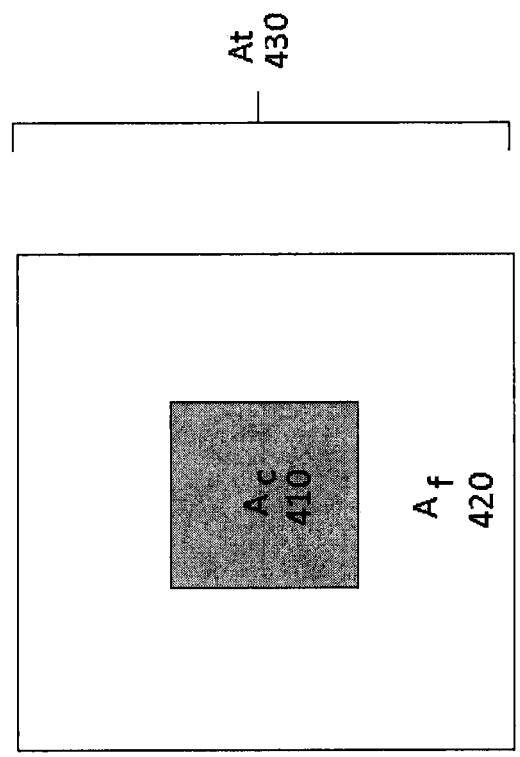
FIG. 4 is a plan view of a single layer within a laminate.

FIG. 4 is a plan view of a layer 300 within a laminate 306. For each layer 300 in the laminate design, the surface area is quantified as either chip site area ($A_c$) 410 or fanout area ($A_f$) 420. Together, the chip site area ($A_c$) 410 and fanout area ($A_f$) 420 comprise the total area ($A_t$) 430 for the layer, such that ($A_t = A_c + A_f$).

Figure 5:
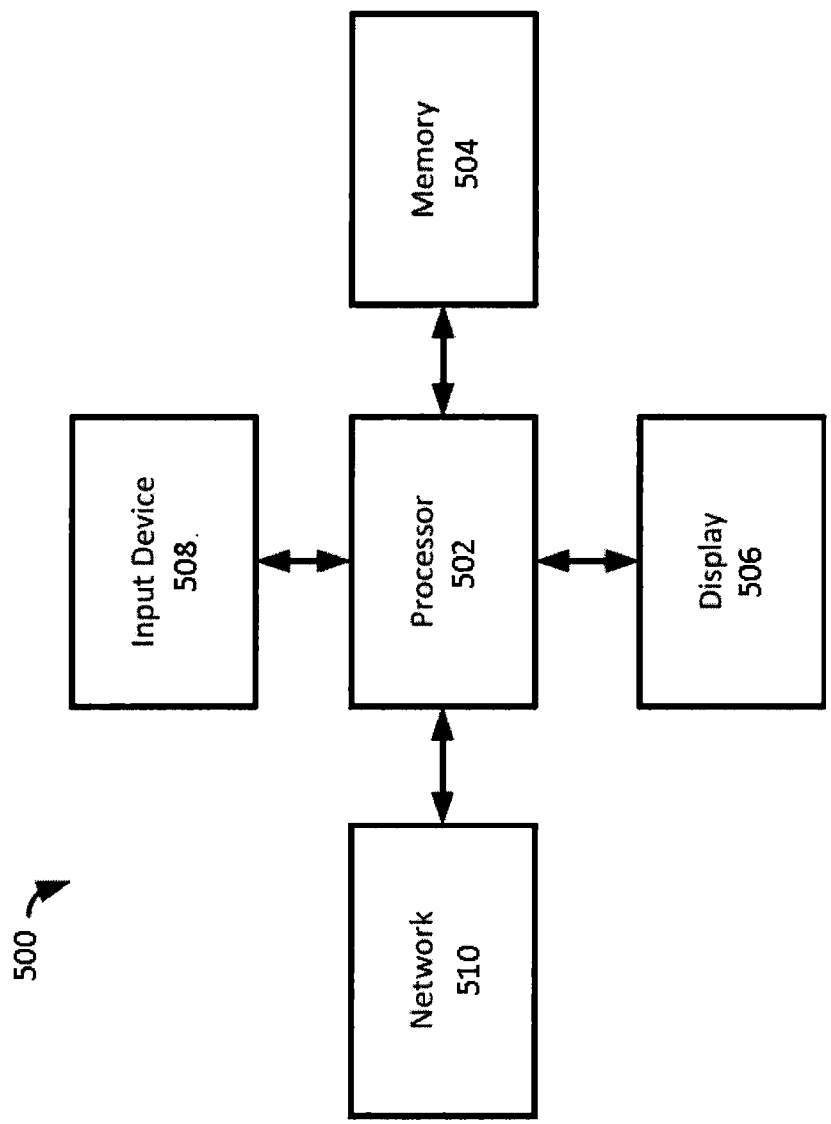
FIG. 5 illustrates a block diagram of an exemplary embodiment of a processing system.

FIG. 5 illustrates a block diagram of an exemplary embodiment of a processing system 500. The processing system 500 includes a processor 502 that is communicatively connected to a memory 504, a display 506, an input device 508, and a network 510. The processing system 500 is operative to perform the methods described herein. (The numbers shown in the FIG. 5 are marked as 5xx but this section calls them as 3xx. This should be rectified)

An equation for determining Out of Plane Imbalance between Layer Pair 110 is given by Equation 1:

% $Cu_{Out-of-plane\ imbalance\ between\ layers}$=
(%$CU_{FCx}$-%$CU_{BCx}$)  Equation 1:

An equation to calculate the in-plane copper imbalance should satisfy the following four conditions:
Condition 1:
If % $Cu_{chip}$=% $Cu_{fanout}$, then $CU_{InPlane\ imbalance}$=0 for all $Ac/At$
Condition 1:
If $Ac$=0, $CU_{Inplane\ imbalance}$=0
Condition 3:
If $A_f$=0 i.e. $A_c/A_t$=1, $CU_{Inplane\ imbalance}$=0
Condition 4:
For a given % $Cu_{chip}$ and % $CU_{fanout}$,
$Cu_{Inplane\ imbalance}$ is maximum when $Ac=Af$ (i.e when $Ac/At$=0.5).

In-Plane Copper Imbalance Calculation between Layer Pairs 140 is a two step process. In Step 1, In-plane Copper Imbalance per layer 130 is calculated for each layer 300 separately using the following Equation 2:

$$Cu_{Inplane\ Imbalance\ for\ a\ layer} = 4(\%\ Cu_{chip} - \%\ Cu_{fanout})\frac{A_c/A_f}{(1+A_c/A_f)^2}$$ Equation 2

In Step 2, In-plane copper imbalance between the Layer Pair 140 is calculated, using Equation 3:

$Cu_{In-plane\ Imbalance\ between\ layers}$=
($CU_{FCx}^{Inplane\ Imbalance} - Cu_{BCx}^{Inplane\ Imbalance}$)  Equation 3:

In the Effective Copper Imbalance Calculation 150 the Out of Plane Copper Imbalance is given more weight when away from the core, indicated by:
Weight α (distance from core center)$^{m1}$, in which $^{m1}$ is the Out of Plane Leverage Exponent.

Effective Out of Plane $Cu$ Imbalance =

$$\frac{\sum weights \times Out\ of\ Plane\ Cu\ Imbalance\ between\ layers}{\sum weights}$$

In Plane $Cu$ Imbalance is given more weight when away from the core, indicated by:
Weight α (distance from core center)$^{m2}$, in which $^{m2}$ is the In Plane Leverage Exponent.

Effective In Plane $Cu$ Imbalance =

$$\frac{\sum weights \times In\ Plane\ Cu\ Imbalance\ between\ layers}{\sum weights}$$

The Warpage Prediction Equation 160 is a bi-linear equation used to regress the measured warpage/area with the out-of-plane and in-plane copper imbalances normalized by the core thickness $$\frac{\text{Warpage}}{\text{Area}} = A_o + A_1 \frac{\text{Effective Out of Plane } Cu \text{ Imbalance}}{(\text{Core\_Thick ness})^4} + A_2 \frac{\text{Effective In Plane } Cu \text{ Imbalance}}{(\text{Core\_Thick ness})^4}$$

Adjusted $R^2$ used instead of $R^2$ to determine the efficacy of the regression. Adjusted $R^2$ can be positive or negative. Can decrease with addition of an additional input parameter if it does not explain the variation of the dependent variable.

$$\bar{R}^2 = 1 - (1 - R^2)\frac{n-1}{n-p-1}$$

The Root mean squared error (RMSE) is calculated in addition to Adjusted $R^2$ and gives a measure of one standard deviation error in warpage prediction. Once the constants $A_0$, $A_1$ and $A_2$ have been determined based on measured data for a known set of laminates, the equation can be used to predict the warpage for any laminate design, as illustrated in Table 1, below.

TABLE 1

| Area | Warpage Type | Out/In Plane | In Plane leverage (m2) | Out of plane leverage (m1) | Goodness of Fit (Adj R2) | RMSE in Area |
|---|---|---|---|---|---|---|
| Chip Site | Incoming | Out of Plane | NA | 0 | 0.24 | 3.01 |
| Chip Site | Incoming | In Plane | 0 | NA | 0.52 | 2.46 |
| Chip Site | incoming | Both | 2 | 0 | 0.53 | 2.46 |
| Chip Site | Thermal | Out of Plane | NA | 0 | 0.73 | 1.70 |
| Chip Site | Thermal | In Plane | 0 | NA | 0.75 | 1.92 |
| Chip Site | Thermal | Both | 2 | 2 | 0.87 | 1.37 |
| Full Laminate | Thermal | Out of Plane | NA | 0 | 0.43 | 15.49 |
| Full Laminate | Thermal | In Plane | 0 | NA | 0.68 | 11.10 |
| Full Laminate | Thermal | Both | 0 | 2 | 0.81 | 9.01 |

Predictability is determined from Adjusted $R^2$ and RMSE. To calculate RMSE, a defined Chip site area is chosen, in this case 20 mm×20 mm, and the Full laminate area is chosen, in this case 55 mm×55 mm. The data presented on Table 1 demonstrate that Warpage predictability is higher if only in-plane copper imbalance is used instead of only out-of-plane copper imbalance. Predictability of warpage increases when in-plane copper imbalance is included in addition to out-of-plane copper imbalance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of designing an organic build-up laminate comprising:
   substantially completing a laminate design;
   calculating a copper imbalance, wherein calculating the copper imbalance is based on an in-plane copper imbalance and the out of plane copper imbalance;
   predicting a laminate warpage based on the copper imbalance;
   modifying the design by adding or removing copper from select areas to reduce the copper imbalance;
   recalculating the copper imbalance; and
   predicting the laminate warpage based on the recalculated copper imbalance, wherein an in-plane copper resistance is calculated for each layer separately using the following Equation 2:

$$Cu_{Inplane\ Imbalance\ for\ a\ layer} = 4(\%\ Cu_{chip} - \%\ Cu_{fanout})\frac{A_c/A_f}{(1+A_c/A_f)^2} \quad \text{Equation 2}$$

then, the in-plane copper imbalance between the layer pair is calculated, using Equation 3:

$$Cu_{In\text{-}plane\ Imbalance\ between\ Layers} = (Cu_{FCx}{}^{Inplane\ Imbalance} - Cu_{BCx}{}^{Inplane\ Imbalance}) \quad \text{Equation 3}$$

2. The method of claim 1, wherein calculating the copper imbalance is based on an in-plane copper imbalance.

3. The method of claim 1, wherein the predicted laminate warpage is the chip site absolute warpage.

4. The method of claim 1, wherein the predicted laminate warpage is the chip site thermal warpage.

5. The method of claim 1, wherein the predicted laminate warpage is the full laminate thermal warpage.

6. A system comprising:
   a memory; and
   a processor operative to:
   substantially complete a laminate design;
   calculate a copper imbalance, wherein an in-plane copper resistance is calculated for each layer separately using the following Equation 2:

$$Cu_{Inplane\ Imbalance\ for\ a\ layer} = 4(\%\ Cu_{chip} - \%\ Cu_{fanout})\frac{A_c/A_f}{(1+A_c/A_f)^2} \quad \text{Equation 2}$$

then, in-plane copper imbalance between the layer pair is calculated, using Equation 3:

$$Cu_{\text{In-plane Imbalance between Layers}} = (Cu_{FCx}^{\text{Inplane Imbalance}} - Cu_{BCx}^{\text{Inplane Imbalance}}) \quad \text{Equation 3}$$

predict a laminate warpage based on the copper imbalance;

modify the design by adding or removing copper from select areas to reduce the copper imbalance;

recalculate the copper imbalance; and predict the laminate warpage based on the improved copper imbalance.

7. The system of claim 6, wherein calculating the copper imbalance is based on the in-plane copper imbalance.

8. The system of claim 6, wherein calculating the copper imbalance is based on the in-plane copper imbalance and the out of plane copper imbalance.

9. The system of claim 6, wherein the predicted laminate warpage is the chip site absolute warpage.

10. The system of claim 6, wherein the predicted laminate warpage is the chip site thermal warpage.

11. The system of claim 6, wherein the predicted laminate warpage is the full laminate thermal warpage.

12. A computer program product comprising a computer readable storage medium having program instructions embodied therewith, the program instructions executable by a processor to cause the processor to perform a method comprising:

substantially completing a laminate design;

calculating a copper imbalance, wherein an in-plane copper resistance is calculated for each layer separately using the following Equation 2:

$$Cu_{\text{Inplane Imbalance for a layer}} = 4(\% \, Cu_{chip} - \% \, Cu_{fanout}) \frac{A_c / A_f}{(1 + A_c / A_f)^2} \quad \text{Equation 2}$$

then, in-plane copper imbalance between the layer pair is calculated, using Equation 3:

$$Cu_{\text{In-plane Imbalance between Layers}} = (Cu_{FCx}^{\text{Inplane Imbalance}} - Cu_{BCx}^{\text{Inplane Imbalance}}) \quad \text{Equation 3}$$

predicting a laminate warpage based on the copper imbalance;

modifying the design by adding or removing copper from select areas to reduce the copper imbalance;

recalculating the copper imbalance; and predicting the laminate warpage based on the improved copper imbalance.

13. The computer program product of claim 12, wherein calculating the copper imbalance is based on the in-plane copper imbalance.

14. The computer program product of claim 12, wherein calculating the copper imbalance is based on the in-plane copper imbalance and the out of plane copper imbalance.

15. The computer program product of claim 12, wherein the predicted laminate warpage is the chip site thermal warpage.

16. The computer program product of claim 12, wherein the predicted laminate warpage is the full laminate thermal warpage.

* * * * *